(12) United States Patent
Tandon

(10) Patent No.: US 10,262,071 B1
(45) Date of Patent: Apr. 16, 2019

(54) APPARATUS, SYSTEM, AND METHOD FOR DISTRIBUTING MANAGEMENT DATA IN MULTI-NMS ENVIRONMENTS

(71) Applicant: Juniper Networks, Inc., Sunnyvale, CA (US)

(72) Inventor: Abhinav Tandon, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 660 days.

(21) Appl. No.: 14/710,633

(22) Filed: May 13, 2015

(51) Int. Cl.
*G06F 17/30* (2006.01)
*H04L 29/08* (2006.01)

(52) U.S. Cl.
CPC .... *G06F 17/30876* (2013.01); *H04L 67/1097* (2013.01)

(58) Field of Classification Search
CPC ........................ G06F 17/30876; H04L 67/1097
USPC ......... 707/705, 764, 770, 736, 802; 709/224
See application file for complete search history.

(56) References Cited

U.S. PATENT DOCUMENTS

| | | | | |
|---|---|---|---|---|
| 5,751,964 A * | 5/1998 | Ordanic | ............... | H04L 41/0213 345/418 |
| 6,076,107 A * | 6/2000 | Chen | ..................... | H04L 41/046 709/202 |
| 6,426,947 B1 * | 7/2002 | Banker | ............... | H04L 41/0213 370/254 |
| 6,968,371 B1 * | 11/2005 | Srinivasan | ............ | H04L 41/042 709/223 |
| 7,606,884 B2 * | 10/2009 | Palmer | ................ | H04L 41/0213 709/206 |
| 7,734,761 B2 * | 6/2010 | Jai | ........................ | H04L 41/0213 709/224 |
| 7,797,409 B1 * | 9/2010 | Secer | ...................... | H04L 41/22 709/223 |
| 7,885,940 B2 * | 2/2011 | Hegde | ................... | H04L 43/103 707/687 |
| 2006/0172742 A1 | 8/2006 | Chou et al. | | |
| 2006/0235971 A1 | 10/2006 | McCloghrie et al. | | |

(Continued)

OTHER PUBLICATIONS

Rajesh et al., Network Management System Using Web Services and Service Oriented Architecture—A Case Study, 2006 IEEE/IFIP Network Operations and Management Symposium NOMS 2006, Year: 2006, pp. 1-4.*

(Continued)

*Primary Examiner* — Greta L Robinson
(74) *Attorney, Agent, or Firm* — FisherBroyles, LLP

(57) ABSTRACT

The disclosed apparatus may include (1) a database that stores management data in connection with a network protocol implemented within a network that includes a plurality of NMSes and (2) a processing unit having access to the database, wherein the processing unit (A) receives, from an NMS within the plurality of NMSes, a request for at least a portion of the management data stored in the database and then, in response to receiving the request from the NMS, (B) retrieves the requested portion of management data from the database, (C) provides the requested portion of management data to the NMS, and (D) provides the requested portion of management data to at least one additional NMS within the plurality of NMSes even though the additional NMS did not initiate the request for the portion of management data. Various other apparatuses, systems, and methods are also disclosed.

19 Claims, 7 Drawing Sheets

(56) References Cited

U.S. PATENT DOCUMENTS

| | | |
|---|---|---|
| 2007/0192406 A1 | 8/2007 | Frietsch et al. |
| 2009/0103916 A1 | 4/2009 | Dolan, III |
| 2011/0148587 A1 | 6/2011 | Eun et al. |
| 2011/0289181 A1* | 11/2011 | Sankaran ............ H04L 41/0213 709/213 |
| 2014/0101308 A1* | 4/2014 | Wanser .................. H04L 43/08 709/224 |

OTHER PUBLICATIONS

Abhinav Tandon; Apparatus, System, and Method for Distributing Management Data to Network Management Stations; U.S. Appl. No. 14/733,310, filed Jun. 8, 2015.

* cited by examiner

Apparatus 100

```
                            Unsolicited PDU
                                 500

------------------------------------------------------------------------
**********************************************

V2 Trap
Source:      10.216.197.200
Destination: 10.238.148.169
Version:     SNMPv2
Community:   TG1

OID: sysUpTime.0
type: TimeTicks
value: (44320375) 123:06:43.75

OID: snmpTrapOID.0
type: Object
value: linkUp

OID: ifIndex.1073741824
type: Number
value: 1073741824

OID: ifAdminStatus.1073741824
type: Number
value: 3

OID: ifOperStatus.1073741824
type: Number
value: 7

**********************************************
------------------------------------------------------------------------
```

US 10,262,071 B1

APPARATUS, SYSTEM, AND METHOD FOR DISTRIBUTING MANAGEMENT DATA IN MULTI-NMS ENVIRONMENTS

BACKGROUND

In a Simple Network Management Protocol (SNMP) deployment, a Network Management Station (NMS) often polls various network devices (such as routers and/or switches) for management data related to their performance and/or health. In the event that such an SNMP deployment includes multiple NMSes, each of the NMSes may poll the various network devices for the same management data. For example, during any given polling cycle, an NMS may send a request for certain management data to a network device that facilitates network traffic within a network. Similarly, during the same polling cycle, another NMS may send a separate request for the same management data to the network device. As a result, the network device may service these requests separately by executing the same code sequence multiple times during the polling cycle, thereby potentially leading to superfluous processing and/or inefficient resource consumption.

The instant disclosure, therefore, identifies and addresses a need for additional and improved apparatuses, systems, and methods for distributing management data in multi-NMS environments.

SUMMARY

As will be described in greater detail below, the instant disclosure generally relates to apparatuses, systems, and methods for distributing management data in multi-NMS environments. In one example, an apparatus for accomplishing such a task may include (1) a database that stores management data in connection with a network protocol (such as SNMP) implemented within a network that includes a plurality of NMSes and (2) a processing unit having access to the database, wherein the processing unit (A) receives, from an NMS within the plurality of NMSes, a request for at least a portion of the management data stored in the database and then, in response to receiving the request from the NMS, (B) retrieves the requested portion of management data from the database, (C) provides the requested portion of management data to the NMS, and (D) provides the requested portion of management data to at least one additional NMS within the plurality of NMSes even though the additional NMS did not initiate the request for the portion of management data.

Similarly, a network device incorporating the above-described apparatus may include (1) a storage device that stores management data in connection with an SNMP implemented within a network that includes a plurality of NMSes and (2) a processing unit communicatively coupled to the storage device, wherein the processing unit (A) receives, from an NMS within the plurality of NMSes, a request for at least a portion of the management data stored in the storage device and then, in response to receiving the request from the NMS, (B) retrieves the requested portion of management data from the storage device, (C) provides the requested portion of management data to the NMS, and (D) provides the requested portion of management data to at least one additional NMS within the plurality of NMSes even though the additional NMS did not initiate the request for the portion of management data.

A corresponding method may include (1) receiving, from an NMS within a plurality of NMSes included in a network, a request for at least a portion of management data stored within a database in connection with a network protocol implemented within the network and then, in response to receiving the request from the NMS, (2) retrieving the requested portion of management data from the storage device, (3) providing the requested portion of management data to the NMS, and (4) providing the requested portion of management data to at least one additional NMS within the plurality of NMSes even though the additional NMS did not initiate the request for the portion of management data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
FIG. 1 is a block diagram of an exemplary apparatus for distributing management data in multi-NMS environments.
Figure 1:
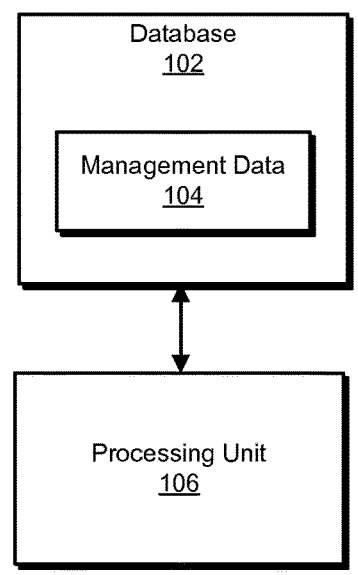

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for distributing management data in multi-NMS environments. The term "network management station" or the abbreviation "NMS," as used herein, generally refers to any type or form of physical or virtual system and/or device that monitors, manages, and/or controls network devices (such as routers, switches, gateways, and/or servers) within a network. The term "multi-NMS environment," as used herein, generally refers to any type or form of networking environment and/or configuration that includes multiple NMSes.

As will be explained in greater detail below, embodiments of the instant disclosure may increase the efficiency of network devices in SNMP deployments that include multiple NMSes. For example, embodiments of the instant disclosure may enable a network device to provide management data to multiple NMSes in response to a single request received from only one of the NMSes. By enabling the network device to provide management data to multiple NMSes in this way, these embodiments may reduce the amount of superfluous processing performed by the network device and/or reduce the network device's consumption of resources.

The following will provide, with reference to FIG. 1, examples of apparatuses that facilitate distribution of management data in multi-NMS environments. The discussion corresponding to FIG. 2 will provide detailed descriptions of an exemplary implementation of the apparatus from FIG. 1. The discussions corresponding to FIGS. 3, 4, and 5 will provide detailed descriptions of an exemplary request, an exemplary response, and an exemplary unsolicited Protocol Data Unit (PDU), respectively. The discussion corresponding to FIG. 6 will provide a detailed description of an exemplary method for distributing management data in multi-NMS environments. Finally, the discussion corresponding to FIG. 7 will provide numerous examples of systems that may incorporate the apparatus from FIG. 1.

FIG. 1 shows a block diagram of an exemplary apparatus 100 for distributing management data in multi-NMS environments. Apparatus 100 generally represents any type or form of system, device, and/or mechanism that facilitates distribution of management data in multi-NMS environments. Examples of apparatus 100 include network devices, routers, switches, hubs, modems, bridges, repeaters, gateways, multiplexers, network adapters, portions of one or more of the same, variations of one or more of the same, combinations of one or more of the same, or any other suitable apparatus.

As shown in FIG. 1, apparatus 100 may include a processing unit 106 with access to and/or in communication with a database 102. The term "processing unit," as used herein, generally refers to any type or form of physical hardware, circuit, device, and/or processor that performs certain Input/Output (I/O) operations and/or computing tasks directed to distributing and/or providing management data in multi-NMS environments. In one example, processing unit 106 may represent an integrated circuit whose configuration and/or infrastructure is at least partially fixed. Additionally or alternatively, processing unit 106 may represent an integrated circuit whose configuration and/or infrastructure is at least partially variable and/or programmable. Examples of processing unit 106 include, without limitation, processors, microprocessors, microcontrollers, Central Processing Units (CPUs), Field-Programmable Gate Arrays (FPGAs), Application-Specific Integrated Circuits (ASICs), software modules installed one or more of the same, portions of one or more of the same, variations of one or more of the same, combinations of one or more of the same, or any other suitable processing unit.

Database 102 generally represents any type or form of organized collection of data. In one example, database 102 may include and/or represent all or a portion of data stored on a storage device included in apparatus 100 or one or more other network devices (not necessarily illustrated in FIG. 1 or 2). Accordingly, although database 102 is illustrated as part of apparatus 100 in FIG. 1, database 102 may alternatively include and/or represent data stored in a network device (not illustrated in FIG. 1 or 2) in communication with apparatus 100. For example, apparatus 100 may operate as an SNMP proxy that includes an SNMP agent. In this example, the SNMP agent may manage, access, and/or modify database 102 maintained and/or stored on a remote network device.

Figure 2:
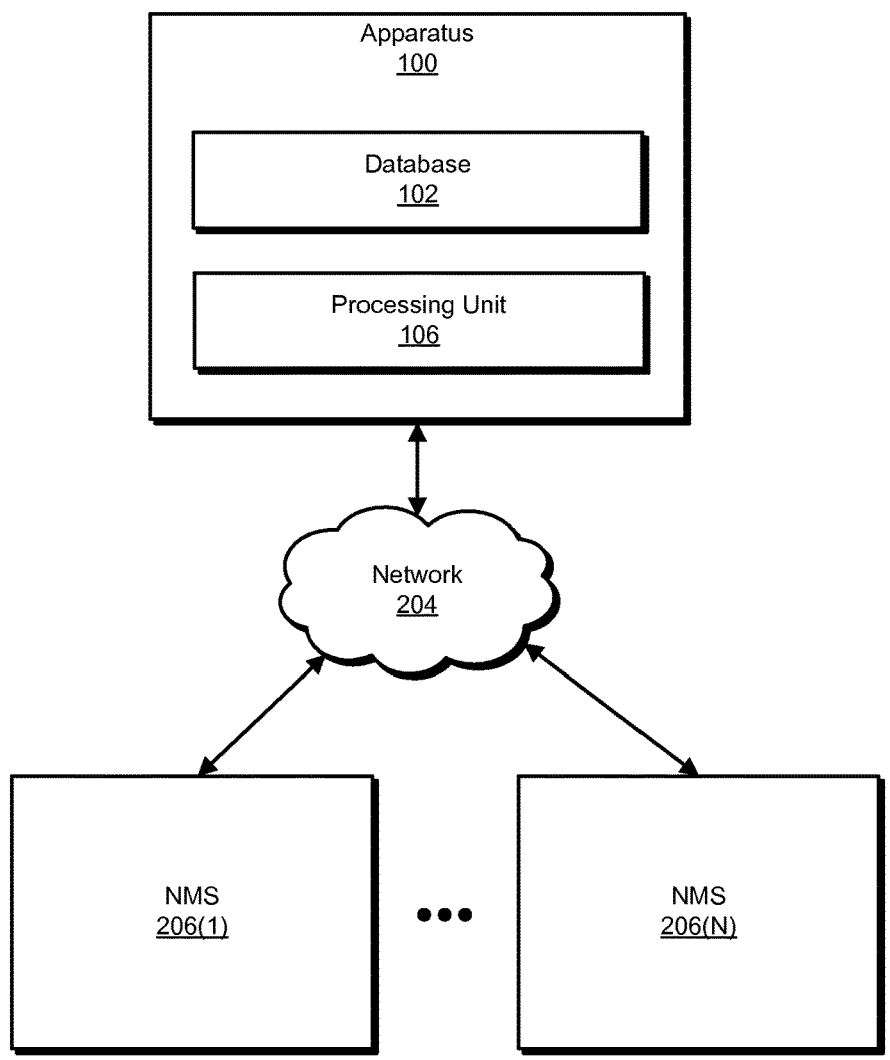
FIG. 2 is a block diagram of an exemplary implementation of an apparatus for distributing management data in multi-NMS environments.

In another example, database 102 may include and/or represent all or portions of data stored across multiple storage devices included in apparatus 100 or one or more network devices (not necessarily illustrated in FIG. 1 or 2). Examples of such storage devices include, without limitation, Hard Disk Drives, (HDDs), Solid-State Drives (SSDs), flash drives, Random-Access Memory (RAM) devices, caches, virtual storage devices, variations of one or more of the same, combinations of one or more of the same, or any other suitable storage devices.

In one example, database 102 may be organized and/or formatted as a tree data structure and/or Management Information Base (MIB). In this example, the data (such as management data 104 in FIG. 1) stored in database 102 may be searchable by an Object IDentifier (OID). In other words, the key to database 102 may include and/or represent the OID of the object being searched.

Additionally or alternatively, database 102 may not necessarily be organized and/or formatted internally to the network device (e.g., apparatus 100 or another network device) on which database 102 is located. However, in this example, database 102 may appear and/or be presented externally to remote network devices in an organized and/or formatted view or configuration (such as a MIB tree).

As shown in FIG. 1, database 102 may include and/or store management data 104. The term "management data," as used herein, generally refers to any type or form of data, information, and/or statistics related to an apparatus included in a network. Database 102 may store management data 104 in connection with a network protocol implemented within a network (such as network 204 in FIG. 2). For example, database 102 may store data, information, and/or statistics pertinent to the SNMP protocol implemented and/or deployed in the network.

In one example, management data 104 may include and/or represent statistics information about network traffic handled by and/or passing through apparatus 100. For example, management data 104 may identify the amount of network traffic handled by and/or passing through apparatus 100. Additionally or alternatively, management data 104 may include and/or represent performance and/or health information related to apparatus 100. For example, management data 104 may identify the amount of processing power used by apparatus 100 over a certain period of time and/or the number of data packets received and/or forwarded by apparatus 100 over a certain period of time.

In another example, management data 104 may indicate whether apparatus 100 has experienced any type or form of failure and/or security attack during a certain period of time. Accordingly, examples of management data 104 include, without limitation, fault information, configuration information, accounting information, administrative information, performance information, health information, security information, variations of one or more of the same, combinations of one or more of the same, or any other suitable management data.

In some examples, processing unit 106 may be communicatively coupled to a storage device that includes database 102. In such examples, processing unit 106 may receive a request for a portion of management data 104 from an NMS included in a network. In response to receiving the request from the NMS, processing unit 106 may retrieve the requested portion of management data 104 from database 102 included in the storage device.

Upon retrieving the requested portion of management data 104, processing unit 106 may provide and/or send the requested portion of management data 104 to the NMS by way of the network. In addition, processing unit 106 may be configured, programmed, or designed to provide and/or send the same portion of management data 104 to at least one additional NMS included in the network. Accordingly, processing unit 106 may provide and/or send the requested portion of management data 104 to an additional NMS included in the network even though the additional NMS did not initiate the request for the portion of management data 104. By providing and/or sending the portion of management data 104 to the additional NMS even though the additional NMS did not initiate the request for the portion of management data 104, processing unit 106 may be able to reduce the amount of redundant processing and/or the amount of resource consumption that is involved in distributing the portion of management data 104 to multiple NMSes.

FIG. 2 shows a block diagram of an exemplary implementation 200 of apparatus 100 for distributing management data in multi-NMS environments. As illustrated in FIG. 2, implementation 200 may include apparatus 100 in communication with NMSes 206(1)-(N) via a network 204. The term "network," as used herein, generally refers to any type or form of medium and/or architecture that facilitates communication or data transfer. In one example, network 204 may include and/or represent a plurality of computing devices.

Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations of one or more of the same, combinations of one or more of the same, or any other suitable network. Network 204 may facilitate communication or data transfer using wireless or wired connections. Although apparatus 100 and NMSes 206(1)-(N) are illustrated as being external to network 204 in FIG. 2, apparatus 100 and/or NMSes 206(1)-(N) may alternatively represent portions of network 204 and/or be included in network 204.

Figure 3:
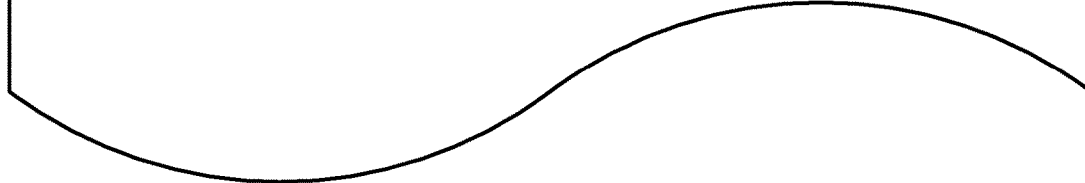
FIG. 3 is an illustration of an exemplary request initiated by an NMS for management data.

In some examples, NMS 206(1) may initiate a request for a specific portion of management data 104. For example, NMS 206(1) may generate a request 300 in FIG. 3 for a portion of management data 104. As illustrated in FIG. 3, request 300 may identify the request type (in this example, "Get-Next-Request"), the Internet Protocol (IP) address of the source device (in this example, "10.212.163.99"), the IP address of the destination device (in this example, "10.216.197.200"), the network protocol version (in this example, "SNMPv2"), the request identifier (in this example, "0x5974c055"), an SNMP community (in this example, "abhinavt"), any error indicators (in this example, "status=0/vb_index=0"), and an OID of the requested management data (in this example, "ifDescr.533"). In this example, the SNMP community identified in request 300 may be used to determine which management data NMS 206(1) and/or an application running on NMS 206(1) is able to access by way of request 300.

In one example, NMS 206(1) may include an SNMP subsystem that manages requests for management data. In this example, the SNMP subsystem may receive a query from an application (such as a software program) running on NMS 206(1). This query may identify the specific portion of management data 104 to request from apparatus 100. In response to receiving this query from the application, the SNMP subsystem may generate request 300 to request the specific portion of management data 104 from apparatus 100.

To ensure that request 300 corresponds to the application that initiated the query, the SNMP subsystem may insert a request identifier specific to the application within request 300. For example, the "0x5974c055" request identifier may uniquely correspond to and/or be uniquely specific to the application that initiated the query. In this example, the SNMP subsystem may add the "0x5974c055" request identifier to request 300 to associate request 300 with the querying application.

Upon generating request 300, NMS 206(1) may provide and/or send request 300 to apparatus 100 via network 204. As request 300 reaches apparatus 100, processing unit 106 may detect and/or receive request 300. In response to receiving request 300 from NMS 206(1), processing unit 106 may obtain and/or retrieve the requested portion of management data 104 from database 102. For example, processing unit 106 may search database 102 for the requested portion of management data 104 by using the OID included in request 300 as the database key.

Upon obtaining and/or retrieving the requested portion of management data 104, processing unit 106 may initiate a response to request 300 in FIG. 3. The response to request 300 may include the requested portion of management data 104. For example, processing unit 106 may generate a response 400 in FIG. 4 that includes the requested portion of management data 104. In this example, response 400 may include and/or represent a PDU.

Figure 4:
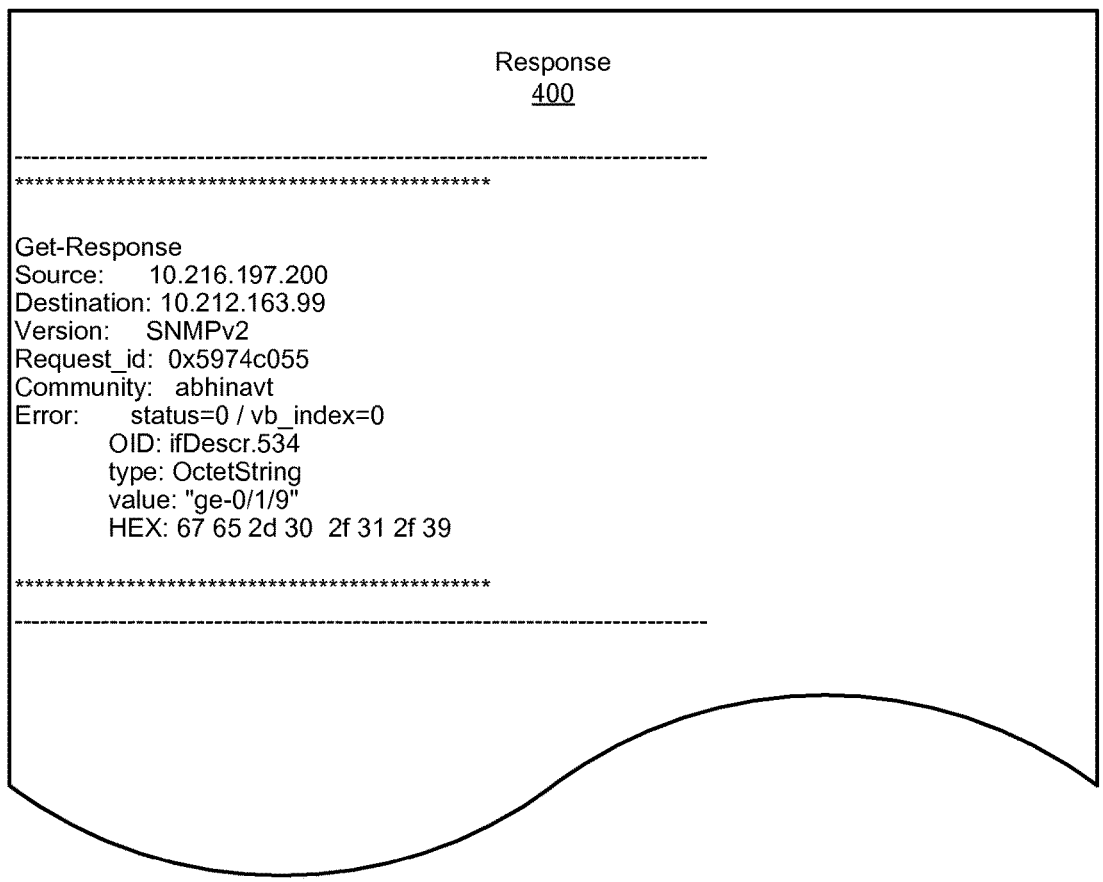
FIG. 4 is an illustration of an exemplary response initiated in reply to a request for management data.

As illustrated in FIG. 4, response 400 may identify the response type (in this example, "Get-Response"), the IP address of the source device (in this example, "10.216.197.200"), the IP address of the destination device (in this example, "10.212.163.99"), the network protocol version (in this example, "SNMPv2"), the request identifier (in this example, "0x5974c055"), the SNMP community identified in request 300 (in this example, "abhinavt"), any error indicators (in this example, "status=0/vb_index=0"), an OID of the requested management data (in this example, "ifDescr.533"), a data type of the requested management data (in this example, "OctetString"), the current value of the requested management data (in this example, "ge-0/1/9"), and a hexadecimal representation of the requested management data (in this example, "67 65 2d 30 2f 31 2f 39").

Upon generating response 400, processing unit 106 may provide and/or send response 400 to NMS 206(1) via network 204. As response 400 reaches NMS 206(1), the SNMP subsystem running on NMS 206(1) may detect and/or receive response 400. The SNMP subsystem may then determine which application to provide with the requested portion of management data included in response 400 based at least in part on the request identifier.

For example, the SNMP subsystem may identify the "0x5974c055" request identifier included in response 400. In this example, the "0x5974c055" request identifier may uniquely correspond to and/or be uniquely specific to the application that initiated the query received by the SNMP subsystem, which in turn initiated request 300. Upon identifying the application that initiated the query based on the "0x5974c055" request identifier, the SNMP subsystem may provide response 400 and/or the requested portion of management data included in response 400 to the application. The application may then consume and/or process the requested portion of management data.

In some examples, NMS 206(1) may poll apparatus 100 and/or processing unit 106 for a certain portion of management data 104 on a regular basis. In one example, request 300 in FIG. 3 may represent an attempt by NMS 206(1) to poll apparatus 100 and/or processing unit 106 during a polling cycle. For example, the polling cycle may represent and/or amount to a period of time anywhere between 30 seconds and 300 seconds. In this example, NMS 206(1) may poll apparatus 100 and/or processing unit 106 on a regular basis by initiating a new request for a certain portion of management data 104 every 30 seconds or up to every 300 seconds. During each polling cycle, apparatus 100 and/or processing unit 106 may process and/or handle polls for between 30,000 and 60,000 OIDs.

In some examples, NMSes 206(1)-(N) may each be configured, programmed, or designed to consume and/or process a certain portion of management data 104 on a regular basis. In one example, NMS 206(N) may be configured, programmed, and/or designed to consume and/or process the same portion of management data 104 as NMS 206(1) during each polling cycle. For example, NMS 206(N) may need to consume and/or process the portion of management data 104 included in response 400 at approximately the same time as NMS 206(1) even though NMS 206(N) did not initiate a request for that portion of management data 104.

In some examples, NMSes 206(1)-(N) may be logically grouped together as a community or any other logical grouping of devices. For example, NMSes 206(1)-(N) may be grouped together as the "abhinavt" community listed in request 300 in FIG. 3 and response 400 in FIG. 4. In this example, processing unit 106 may provide and/or send response 400 (or an equivalent response) to each of NMSes 206(1)-(N) since NMSes 206(1)-(N) have been grouped together as a community. Accordingly, all member devices logically grouped in the community or other logical grouping may receive a secondary and/or unsolicited response to certain requests.

As an example, processing unit 106 may provide and/or send an equivalent response to NMS 206(N) via network 204 or a different network (not necessarily illustrated in FIG. 2) that includes NMS 206(N)) even though NMS 206(N) did not initiate request 300. By providing and/or sending an equivalent response to NMS 206(N) in this way, processing unit 106 may ensure that NMS 206(N) receives the portion of management data 104 requested by NMS 206(1) in request 300 since NMS 206(1) and NMS 206(N) both belong to the "abhinavt" community. In other words, since NMS 206(1) and NMS 206(N) both belong to the "abhinavt" community, these NMSes may be configured, programmed, and/or designed to consume and/or process the same portion of management data 104 during each polling cycle. Accordingly, processing unit 106 may provide and/or send the equivalent response to NMS 206(N) as well due at least in part to NMS 206(N) being included in the community identified within request 300.

In one example, processing unit 106 may generate the equivalent response for NMS 206(N) based at least in part on the portion of management data 104 included in response 400 and/or networking details specific to NMS 206(N). For example, NMSes 206(1) and 206(N) may have different IP addresses. As a result, processing unit 106 may generate an equivalent response that includes the requested portion of management data 104 and identifies the IP address of NMS 206(N) as the destination.

Additionally or alternatively, NMS 206(N) may need to direct the requested portion of management data 104 to another instance of the same application that initiated request 300 on NMS 206(1). However, in this example, the instance of the application running on NMS 206(1) and the other instance of the application running on NMS 206(N) may correspond to differing request identifiers. As a result, processing unit 106 may generate an equivalent response that includes the requested portion of management data 104 and a simulated request identifier that corresponds to the other instance of the application running on NMS 206(N).

In some examples, apparatus 100 and/or processing unit 106 may maintain a record of corresponding IP addresses and/or request identifiers. For example, apparatus 100 and/or processing unit 106 may keep a record that specifies which simulated request identifier for NMS 206(N) corresponds to the "0x5974c055" request identifier for NMS 206(1). In one example, processing unit 106 may identify the simulated request identifier for NMS 206(N) within the record and then generate the equivalent response to include that simulated request identifier. In this example, processing unit 106 may send the equivalent response to NMS 206(N) so that NMS 206(N) is able to provide the requested portion of management data to the other instance of the application running on NMS 206(N). NMS 206(N) may determine, based at least in part on the simulated request identifier included in the equivalent response, that the portion of management data included in the equivalent response is destined for the other instance of the application running on NMS 206(N). The other instance of the application may then consume and/or process that portion of management data.

By providing and/or sending response 400 (or an equivalent response) to NMS 206(N) via network 204 even though NMS 206(N) did not initiate request 300, processing unit 106 may increase the efficiency of apparatus 100 in multi-NMS environments. For example, processing unit 106 may enable apparatus 100 to provide management data to NMSes 206(1)-(N) in response to a single request received from NMS 206(1). By enabling the apparatus 100 to provide management data to NMSes 206(1)-(N) in this way, processing unit 106 may reduce the amount of requests received and/or processed by apparatus 100 and/or reduce the amount of resources consumed in connection with distributing management data to NMSes 206(1)-(N).

In some examples, processing unit 106 may register an application running on one of NMSes 206(1)-(N) to receive unsolicited notifications or PDUs (sometimes also referred to as "trap PDUs" or simply "traps"). These unsolicited PDUs may include a portion of management data 104 and/or be initiated and/or triggered by an event. Examples of such an event include, without limitation, reaching a certain time interval, exceeding a threshold number of requests received from an NMS, detecting a change in network configuration or device configuration, detecting a fault in a network or device, detecting a change in performance or health of a network or device, detecting a security threat in a network or device, variations of one or more of the same, combinations of one or more of the same, or any other suitable event.

As a specific example, processing unit 106 may register an application running on NMS 206(N) to receive unsolicited PDUs every 10 minutes. In this example, each of these unsolicited PDUs may include and/or identify any updates to a subset of management data 104. In one example, such unsolicited PDUs may augment and/or supplement the responses that NMS 206(N) receives in connection with requests initiated by NMS 206(1) for management data. Accordingly, in this example, such unsolicited PDUs may include management data that no application running on NMS 206(1) is interested in consuming.

Continuing with this example, processing unit 106 may detect an event that triggers initiation of an unsolicited PDU. For example, processing unit 106 may determine that 10 minutes has elapsed since the initiation and/or sending of the most recent unsolicited PDU. In response to detecting this event, processing unit 106 may generate an unsolicited PDU 500 in FIG. 5 and then provide and/or send unsolicited PDU 500 in FIG. 5 to NMS 206(N) via network 204. By providing and/or sending the unsolicited PDU to NMS 206(N) in this way, processing unit 106 may enable NMS 206(N) to pass the subset of management data 104 included in unsolicited PDU 500 to the application running on NMS 206(N) that is registered to received such unsolicited PDUs. That application may then consume and/or process the subset of management data.

Figure 5:
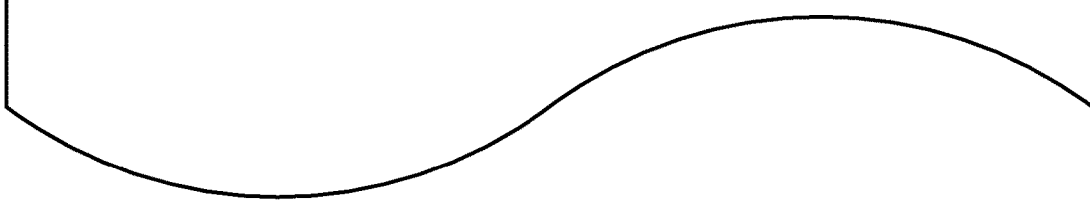
FIG. 5 is an illustration of an exemplary unsolicited Protocol Data Unit (PDU) that includes management data and is destined for an NMS.

As illustrated in FIG. 5, unsolicited PDU 500 may identify the notification type (in this example, "V2 Trap"), the IP address of the source device (in this example, "10.216.197.200"), the IP address of the destination device (in this example, "10.238.148.169"), the network protocol version (in this example, "SNMPv2"), the community of NMSes that are to receive such an unsolicited PDU (in this example, "TG1"), OIDs of the provided management data (in this example, "sysUpTime.0," "snmpTrapOID.0," "ifIndex.1073741824," "ifAdminStatus.1073741824," and "ifOperStatus.1073741824," respectively), data types of the provided management data (in this example, "TimeTicks," "Object," "Number," "Number," and "Number," respectively), the current values of the provided management data (in this example, "(44320375) 123:06:43:75," "linkup," "1073741824," "3," and "7," respectively). In one example, the "TG1" community listed in unsolicited PDU 500 in FIG. 5 may include and/or represent a subset of the "abhinavt" community. More specifically, the "TG1" community may include and/or represent NMS 206(N) and any other NMSes grouped into the "TG1" community.

Figure 6:
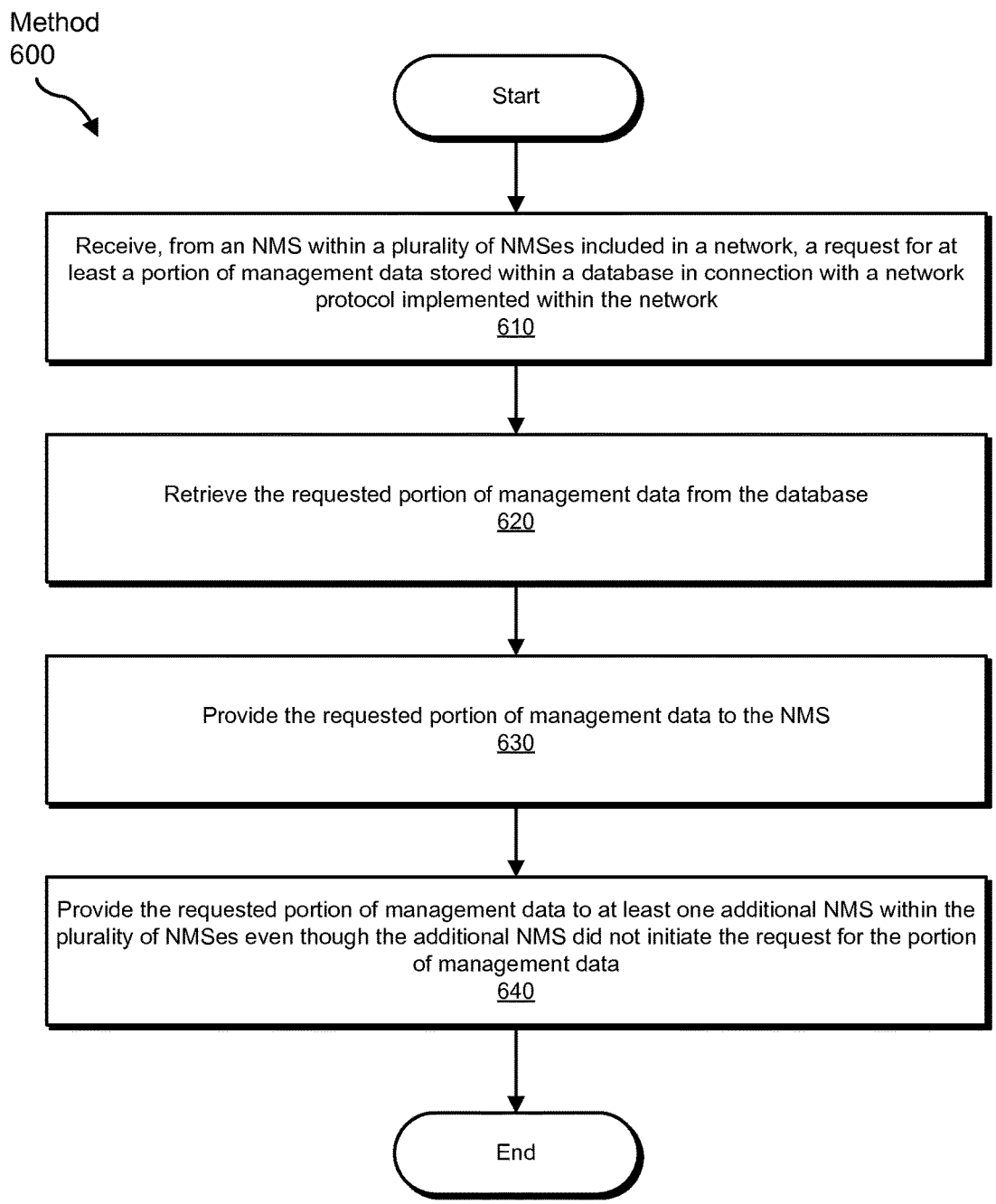
FIG. 6 is a flow diagram of an exemplary method for distributing management data in multi-NMS environments.

FIG. 6 is a flow diagram of an exemplary method 600 for distributing management data in multi-NMS environments. Method 600 may include the step of receiving, from an NMS within a plurality of NMSes included in a network, a request for at least a portion of management data stored within a database in connection with a network protocol implemented within the network (610). This receiving step may be performed in a variety of ways. For example, processing unit 106 may, as part of a router included in network 204, receive a request for a portion of management data 104 stored in database 102 in connection with an SNMP protocol implemented within network 204. Additionally or alternatively, processing unit 106 may, as part of a switch included in network 204, receive a request for a portion of management data 104 stored in database 102 in connection with an SNMP protocol implemented within network 204.

Returning to FIG. 6, method 600 may also include the step of retrieving the requested portion of management data from the storage device (620). This retrieving step may be performed in a variety of ways. For example, processing unit 106 may, as part of the router or switch, search database 102 for the requested portion of management data 104 by using one or more OIDs included in the request as the database key(s). In this example, processing unit 106 may obtain the requested portion of management data 104 from database 102 during the search.

Returning to FIG. 6, method 600 may additionally include the step of providing the requested portion of management data to the NMS (630). This providing step may be performed in a variety of ways. For example, processing unit 106 may, as part of the router or switch, provide and/or send a response to the request received from NMS 206(1) via network 204. In this example, the response may include the requested portion of management data 104.

Returning to FIG. 6, method 600 may further include the step of providing the requested portion of management data to at least one additional NMS within the plurality of NMSes even though the additional NMS did not initiate the request for the portion of management data (640). This providing step may be performed in a variety of ways. For example, processing unit 106 may, as part of the router or switch, provide and/or send another response to the request received from NMS 206(1) via network 204. This other response, however, may be directed to and/or destined for NMS 206(N) even though NMS 206(N) did not initiate any request for the portion of management data. This other response directed to and/or destined for NMS 206(N) may include the requested portion of management data 104.

As explained above in connection with FIGS. 1-5, a network node (such as a router or switch) may be able to reduce the amount of redundant processing and/or the amount of resource consumption that is involved in distributing management data to multiple NMSes. For example, a primary NMS within an SNMP network may receive a query from an application calling for certain management data from the network node. In response to this query, the primary NMS may generate a "GET" request directed to the network node. This "GET" request may include a request identifier that corresponds to the specific application that initiated the query and an OID that corresponds to the called-for management data. The primary NMS may then send this "GET" request to the network node via the SNMP network. The primary NMS may initiate "GET" requests in this way on a regular basis.

Upon receiving the "GET" request, the network node may search for and/or obtain the management data called for by the application by using the OID included in the "GET" request as the key. The network node may then send this management data back to the primary NMS via the SNMP network. For example, the network node may generate a "GET" response to the "GET" request and then send the "GET" response to the primary NMS via the SNMP network. In this example, the "GET" response may include the same request identifier and the management data obtained by the network node using the OID as the key.

Upon receiving the "GET" response, the primary NMS may identify the application to which the "GET" response corresponds by matching the request identifier included in the "GET" response to the application that called for the management data. The primary NMS may then pass the "GET" response and/or the management data included in the "GET" response to the application for consumption and/or processing.

In addition to generating the "GET" response and/or sending the same to the primary NMS, the network node may generate another response PDU and/or a predefined trap PDU and then send the other response PDU and/or trap PDU to a secondary NMS within the SNMP network. This other response PDU and/or trap PDU may be unsolicited in the sense that the secondary NMS did not initiate and/or send any request for such a response PDU and/or trap PDU. In one example, the other response PDU and/or trap PDU may include the same request identifier and the management data obtained by the network node using the OID as the key. Additionally or alternatively, the other response PDU and/or trap PDU may include a simulated request identifier that indicates and/or is used to identify the application running on the secondary NMS to which the management data corresponds.

By distributing the management data in this way, the network node may increase the efficiency of SNMP deployments that include multiple NMSes. For example, by providing management data to multiple NMSes in response to a single "GET" request initiated by a single NMS, the network node may reduce the amount of superfluous request processing and/or the amount of resource consumption involved in distributing management data to multiple NMSes.

Figure 7:
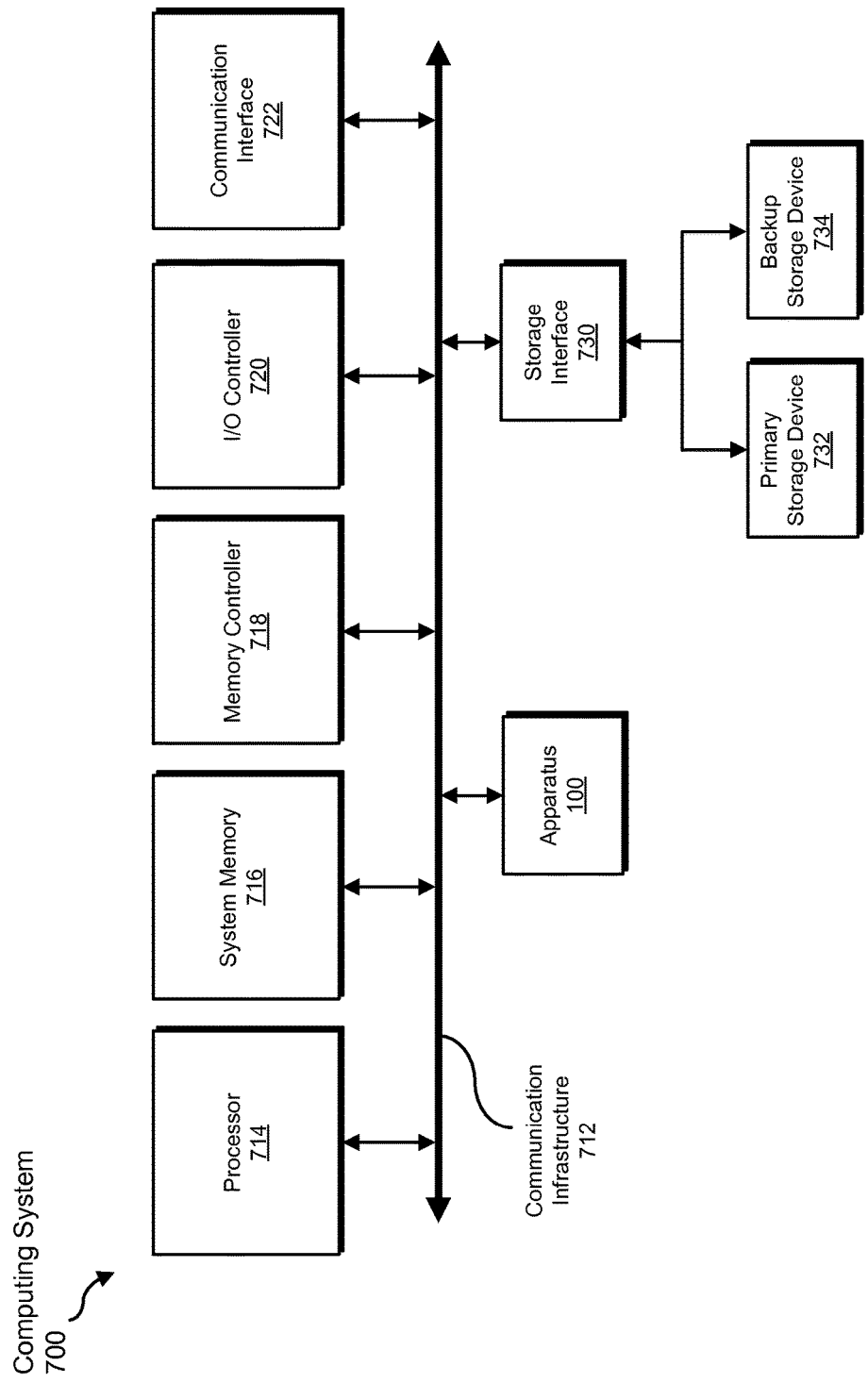
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive management data to be transformed, transform the management data, output a result of the transformation to send to an NMS, use the result of the transformation for processing and/or consumption by an application running on the NMS, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a database that stores management data in connection with a network protocol implemented within a network that includes a plurality of Network Management Stations (NMSes) logically grouped together as a community; and
   a processing unit of a network device having access to the database, wherein the processing unit of the network device:
      receives, from an NMS within the plurality of NMSes, a request for at least a portion of the management data stored in the database, wherein the request identifies the NMS as being included in the logically grouped community;
      in response to receiving the request from the NMS:
         retrieves the requested portion of management data from the database;
         provides the requested portion of management data to the NMS;
         identifies at least one additional NMS within the plurality of NMSes as being included in the logically grouped community; and
         provides, as an unsolicited response to the request, the requested portion of management data to the additional NMS due at least in part to the additional NMS being included in the logically grouped community even though the additional NMS did not initiate the request for the portion of management data; and
      reduces the number of requests processed by the network device in connection with the portion of management data by providing the portion of management data to the additional NMS in response to receiving the request from the NMS.

2. The apparatus of claim 1, wherein the request represents an attempt by the NMS to poll the processing unit for the portion of management data during a polling cycle.

3. The apparatus of claim 2, wherein the NMS and the additional NMS each consume the portion of management data in connection with the polling cycle.

4. The apparatus of claim 2, wherein:
   the processing unit of the network device does not receive any requests for the portion of management data from the additional NMS during the polling cycle.

5. The apparatus of claim 1, wherein the processing unit of the network device provides the requested portion of management data to the additional NMS by:
   identifying, within the request, a request identifier corresponding to an application that initiated the request on the NMS;
   generating a Protocol Data Unit (PDU) that includes:
      the portion of management data requested by the NMS; and
      a simulated request identifier corresponding to an instance of the application running on the additional NMS; and
   providing the PDU to the additional NMS.

6. The apparatus of claim 5, wherein the processing unit of the network device enables the additional NMS to determine, based at least in part on the simulated request identifier included in the PDU, that the portion of management data is destined for consumption by the instance of the application running on the additional NMS.

7. The apparatus of claim 1, wherein the processing unit of the network device:
   registers an application running on at least one of the plurality of NMSes to receive an unsolicited PDU that includes at least a subset of the management data stored in the database;
   detects an event that triggers initiation of the unsolicited PDU; and
   initiates, in response to detecting the event, the unsolicited PDU by:
      generating the unsolicited PDU; and
      providing the unsolicited PDU to the application running on the at least one of the plurality of NMSes.

8. The apparatus of claim 7, wherein the subset of the management data comprises at least one of:
   statistics information about network traffic passing through the network device; and
   performance information about the network device.

9. The apparatus of claim 1, wherein the network protocol comprises a Simple Network Management Protocol (SNMP).

10. A network device comprising:
    a storage device that stores management data in connection with an SNMP implemented within a network that includes a plurality of NMSes logically grouped together as a community; and
    a processing unit communicatively coupled to the storage device, wherein the processing unit:
       receives, from an NMS within the plurality of NMSes, a request for at least a portion of the management data stored in the storage device, wherein the request identifies the NMS as being included in the logically grouped community;
       in response to receiving the request from the NMS:
          retrieves the requested portion of management data from the storage device;
          provides the requested portion of management data to the NMS; and
          provides, as an unsolicited response to the request, the requested portion of management data to the additional NMS due at least in part to the additional NMS being included in the logically grouped community even though the additional NMS did not initiate the request for the portion of management data; and reduces the number of requests processed in connection with the portion of management data by providing the portion of management data to the additional NMS in response to receiving the request from the NMS.

11. The network device of claim 10, wherein the request represents an attempt by the NMS to poll the processing unit for the portion of management data during a polling cycle.

12. The network device of claim 11, wherein the NMS and the additional NMS each consume the portion of management data in connection with the polling cycle.

13. The network device of claim 11, wherein:
the processing unit does not receive any requests for the portion of management data from the additional NMS during the polling cycle.

14. The network device of claim 10, wherein the processing unit provides the requested portion of management data to the additional NMS by:
identifying, within the request, a request identifier corresponding to an application that initiated the request on the NMS;
generating a PDU that includes:
the portion of management data requested by the NMS; and
a simulated request identifier corresponding to an instance of the application running on the additional NMS; and
providing the PDU to the additional NMS.

15. The network device of claim 14, wherein the processing unit enables the additional NMS to determine, based at least in part on the simulated request identifier included in the PDU, that the portion of management data is destined for consumption by the instance of the application running on the additional NMS.

16. The network device of claim 10, wherein the processing unit:
registers an application running on at least one of the plurality of NMSes to receive an unsolicited PDU that includes at least a subset of the management data stored in the storage device;

detects an event that triggers initiation of the unsolicited PDU; and
initiates, in response to detecting the event, the unsolicited PDU by:
generating the unsolicited PDU; and
providing the unsolicited PDU to the application running on the at least one of the plurality of NMSes.

17. The network device of claim 16, wherein the subset of the management data comprises at least one of:
statistics information about network traffic passing through the network device; and
performance information about the network device.

18. A method comprising:
receiving, at a network device, a request from an NMS within a plurality of NMSes that are included in a network and logically grouped together as a community, wherein the request:
is for at least a portion of management data stored within a database in connection with a network protocol implemented within the network; and
identifies the NMS as being included in the logically grouped community;
in response to receiving the request from the NMS:
retrieving, at the network device, the requested portion of management data from the database;
providing, by the network device, the requested portion of management data to the NMS; and
providing, as an unsolicited response by the network device to the request, the requested portion of management data to at least one additional NMS due at least in part to the additional NMS being included in the logically grouped community even though the additional NMS did not initiate the request for the portion of management data; and
reducing the number of requests processed by the network device in connection with the portion of management data by providing the portion of management data to the additional NMS in response to receiving the request from the NMS instead of requiring a separate request for the portion of management data from the additional NMS.

19. The method of claim 18, wherein the request represents an attempt by the NMS to poll the network device for the portion of management data during a polling cycle.

* * * * *